UNITED STATES PATENT OFFICE.

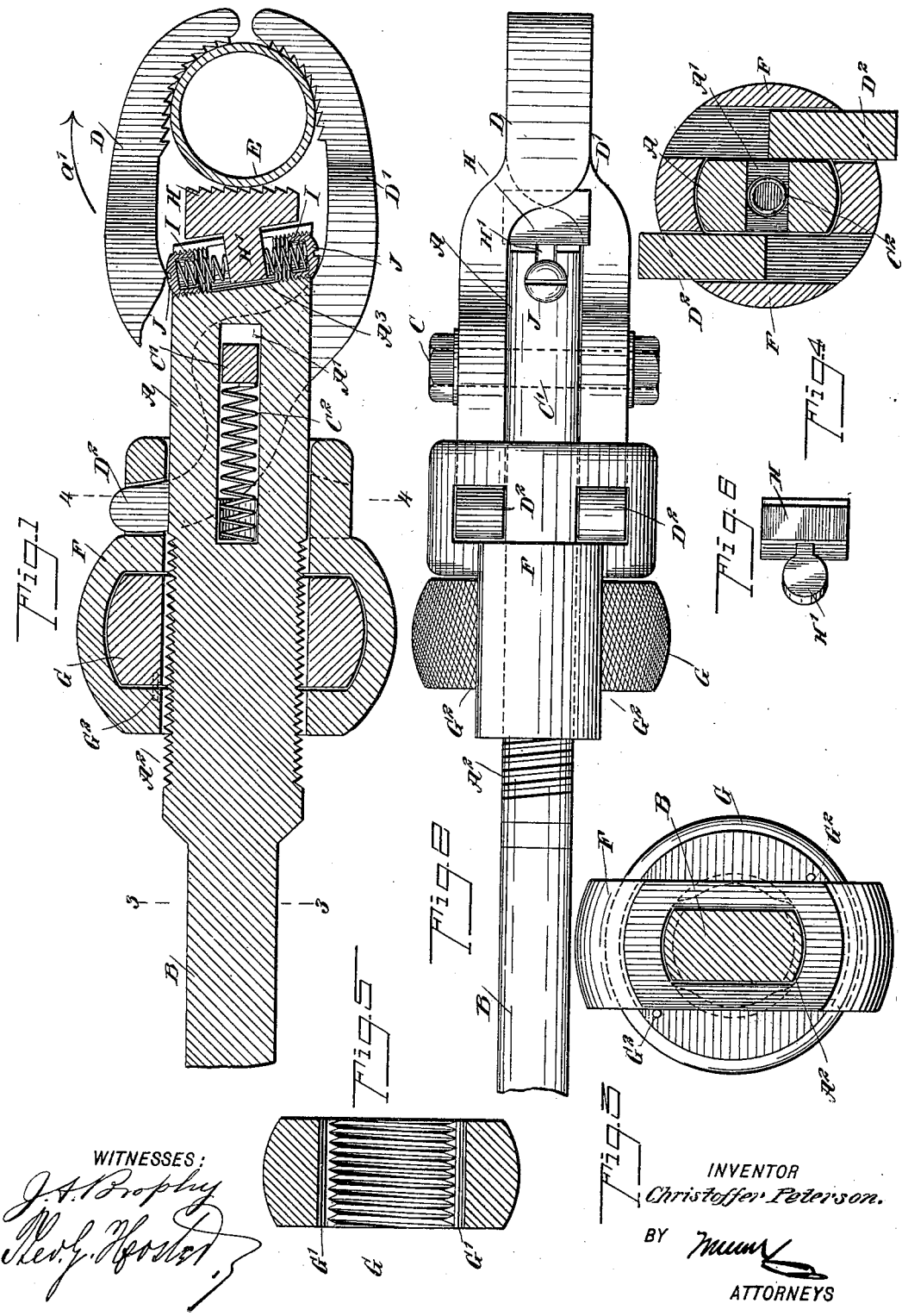

CHRISTOFFER PETERSON, OF LOS BANOS, CALIFORNIA.

PIPE-WRENCH.

SPECIFICATION forming part of Letters Patent No. 667,572, dated February 5, 1901.

Application filed June 14, 1900. Serial No. 20,270. (No model.)

*To all whom it may concern:*

Be it known that I, CHRISTOFFER PETERSON, a citizen of the United States, and a resident of Los Banos, in the county of Merced and State of California, have invented a new and Improved Pipe-Wrench, of which the following is a full, clear, and exact description.

The object of the invention is to provide a new and improved pipe-wrench which is simple and durable in construction, very effective and powerful when applied, and arranged to insure a perfect uniform gripping of the pipe or other article to be operated upon without danger of marring, indenting, or otherwise injuring the article.

The invention consists of novel features and parts and combinations of the same, as will be fully described hereinafter and then pointed out in the claims.

A practical embodiment of the invention is represented in the accompanying drawings, forming a part of this specification, in which similar characters of reference indicate corresponding parts in all the views.

Figure 1 is a longitudinal sectional elevation of the improvement applied to a pipe. Fig. 2 is a plan view of the same. Fig. 3 is a cross-section of the same on the line 3 3 in Fig. 1. Fig. 4 is a similar view of the same on the line 4 4 in Fig. 1. Fig. 5 is a longitudinal sectional elevation of the nut for the slide, and Fig. 6 is a plan view of the auxiliary jaw.

The wrench has a stock A, formed at its rear end with a handle B and provided at its forward end with a longitudinally-extending slot A', in which fits the square portion C' of a transversely-extending pivot C, projecting at its ends beyond the sides of the stock to form fulcrums for the main jaws D D', adapted to engage a pipe E or other article on opposite sides, as is plainly indicated in Fig. 1. The rear ends $D^2$ of the jaws D D' engage apertures in a slide F, mounted to move longitudinally on the stock A, but held against turning thereon, and in the said slide is mounted to turn a nut G, adapted to screw on interrupted threads $A^2$, formed on the stock A for finely adjusting the slide F after the latter has been moved forward the desired distance to engage the gripping ends of the jaws D D' with the pipe E or other article to be operated upon. The nut G is formed with longitudinal cut-out portions G' to permit of sliding the nut on the stock with the slide F for quickly opening and closing the jaws, it being understood that after the jaws are engaged with the article the nut G is turned to engage its threads with the threads $A^2$ and move the slide F farther outward to insure a positive gripping of the jaws upon the article or to lock the slide against return movement.

In order to bring the longitudinal recesses or cut-out portions G' in register with the threads $A^2$ when it is desired to slide the nut on the stock, I provide pins $G^2$, secured on one face of the nut and arranged to abut against the sides of the slide, as will be readily understood by reference to Figs. 1 and 3.

In order to allow the jaws D D' to grip large and small articles, the pivot C is mounted to slide in the stock, and the square portion C' of said pivot C is pressed on by a spring $C^2$ to yieldingly mount the pivot in the stock.

In order to prevent indenting or crushing of the pipe, I employ an auxiliary jaw H, carried at the forward end of the stock A to engage the pipe at a point an equal distance from the points of contact of the jaws D D' with the pipe, as will be readily understood by reference to Fig. 1. This auxiliary jaw H is formed with a tongue H', engaging a correspondingly-shaped groove $A^3$, formed in the forward end of the stock A and extending in an inclined direction relatively to the longitudinal axis of the stock. The tongue H' is pressed on the top and bottom by springs I, held in the groove $H^3$ and engaged by caps J, screwing in the top and bottom ends of the groove, as will be readily understood by reference to Fig. 1. By adjusting the caps J the tension of the springs I can be increased or diminished to allow the movable jaw H to yield with more or less force, according to the nature of the article to be operated upon.

It will be seen that when the jaws D, D', and H engage the pipe E, as shown in Fig. 1, and the handle B of the wrench is taken hold of by the operator and swung in the direction of the arrow a' then the pipe E is firmly gripped by the three jaws and turned in the direction indicated. On the return swinging motion of the handle B the jaws D, D', and H readily glide over the pipe without gripping the same to allow of obtaining a fresh hold on the pipe upon again swinging the handle B in the direction of the arrow a'. It is understood that the construction of the teeth of the jaws D D' H is such as to allow the above-described movement—that is, grip the pipe when the wrench is moved in one direction and glide over the pipe when the wrench is swung in the opposite direction.

From the foregoing it will be readily understood that after the jaws D D' have engaged the pipe E the auxiliary jaw H readily adjusts itself on the pipe to take up any slack or looseness that may be in the main jaws D D', so that the three jaws operate in unison and bear at different points on the pipe to prevent undue marring, indenting, or crushing of the pipe. It is further understood that by having the auxiliary jaw mounted to slide in an inclined direction on the end of the stock A the said jaw readily releases the pipe on the return swinging movement of the wrench, as above described. It is also evident from the foregoing that by the use of the three jaws a very large gripping-surface is obtained, so that the jaws are not liable to slip on the pipe and mar the same, as is so frequently the case with wrenches heretofore constructed.

When it is desired to disengage the jaws D D' from the pipe E, the operator turns the nut G until its cut-out portions G' register with the threads A²—that is, at the time the pins G² strike against the sides of the slide F—and then the operator moves the slide F forward, so as to cause the slide to impart a swinging motion to the jaws D D' and open the same.

Having thus fully described my invention, I claim as new and desire to secure by Letters Patent—

1. A wrench, comprising a stock, main jaws pivoted thereon, means movable on said stock and engaging said main jaws to open and close the same, and an auxiliary jaw yieldingly mounted at the end of the stock, for engaging an article at a point approximately an equal distance from the point of contact of the main jaws, as set forth.

2. A wrench, comprising a stock, a spring-pressed pivot mounted to slide in the stock, main jaws mounted to turn on said pivot, means movable on the stock and engaging said main jaws to open and close the same, means for locking the jaws in position when closed, and an auxiliary jaw carried by the end of the stock for engaging an article at a point appproximately an equal distance from the point of contact of said main jaws, substantially as shown and described.

3. A wrench, comprising a stock, a spring-pressed pivot mounted to slide in the stock, main jaws mounted to turn on said pivot, means movable on the stock and engaging said main jaws to open and close the same, means for locking the jaws in position when closed, an auxiliary jaw carried by the end of the stock for engaging an article at a point approximately an equal distance from the point of contact of said main jaws, said auxiliary jaw having a tongue engaging an inclined groove in the stock, and springs compressing said tongue at the top and bottom, as set forth.

4. A wrench, comprising a stock, a spring-pressed pivot mounted to slide in the stock, main jaws mounted to turn on said pivot, means movable on the stock and engaging said main jaws to open and close the same, means for locking the jaws in position when closed, an auxiliary jaw carried by the end of the stock for engaging an article at a point approximately an equal distance from the point of contact of said main jaws, said auxiliary jaw having a tongue engaging an inclined groove in the stock, springs compressing said tongue at the top and bottom, and caps screwing on said stock for adjusting the tension of said springs, as set forth.

5. A wrench having a stock carrying jaws and formed with a portion having an interrupted thread, a slide on the stock for actuating the movable jaws, and a nut mounted to turn in the slide and having longitudinal cut-out portions for disengaging the nut from the threads of the stock, to permit of freely moving the slide and nut on the stock, substantially as shown and described.

6. A wrench having a stock carrying jaws and formed with a threaded portion, a slide on the stock for actuating the movable jaws, a nut mounted to turn in the slide and having longitudinal cut-out portions for disengaging the nut from the threads of the stock, to permit of freely moving the slide and nut on the stock, and pins on said nut for engaging the sides of said slide, to bring the cut-out portions of the nut in register with the threads on the stock, as set forth.

In testimony whereof I have signed my name to this specification in the presence of two subscribing witnesses.

CHRISTOFFER PETERSON.

Witnesses:
 W. E. HAYES,
 A. TENELLY.